United States Patent [19]
Inada

[11] Patent Number: 5,257,533
[45] Date of Patent: Nov. 2, 1993

[54] MISFIRE DETECTION DEVICE FOR AN INTERNAL COMBUSTION ENGINE

[75] Inventor: Masanori Inada, Himeji, Japan

[73] Assignee: Mitsubishi Denki Kabushiki Kaisha, Tokyo, Japan

[21] Appl. No.: 798,579

[22] Filed: Nov. 26, 1991

[30] Foreign Application Priority Data

Nov. 28, 1990 [JP] Japan ................................ 2-335334

[51] Int. Cl.⁵ .......................................... G01M 15/00
[52] U.S. Cl. .................................................... 73/116
[58] Field of Search ............... 73/116, 117.3; 123/414, 123/419, 436

[56] References Cited
U.S. PATENT DOCUMENTS 4,967,727 11/1990 Takahashi et al. ............. 123/436 X Primary Examiner—Jerry W. Myracle
Attorney, Agent, or Firm—Sughrue, Mion, Zinn, Macpeak and Seas

[57] ABSTRACT

A misfire detection device for an internal combustion engine determines the pulse width $T_1$ and the low level interval $T_2$ of a rotation signal Sc generated by a rotation signal sensor. The rising and falling edges of the pulses of the rotation signal Sc corresponds to predetermined reference angular positions of respective cylinders. The ratio $T_2/T_1$ or $T_2/(T_1+T_2)$ is calculated and an occurrence of misfire is detected when the ratio exceeds a predetermined reference level.

2 Claims, 4 Drawing Sheets

MISFIRE DETECTION DEVICE FOR AN INTERNAL COMBUSTION ENGINE

BACKGROUND OF THE INVENTION

This invention relates to misfire detection devices for internal combustion engines.

Generally the unburnt gas generated by the misfires of the internal combustion engines not only pollute the atmosphere but may react with the catalyst and, creating an abnormally high temperature, burn out the catalyst. Thus, it is necessary to detect an occurrence of misfire as early possible and to repair the malfunctioning parts.

Thus, various systems are already proposed for detecting misfires of internal combustion engines. For example, Japanese Laid-Open Patent (Kokai) No. 58-138271 proposes a device by which the misfires are detected on the basis of the variations of the rotational speed of the engine. In the case of this device, the average of the rotation periods of the engine is utilized as the reference, and the peak value of the length of period and this average is compared, an occurrence of misfire being determined when the difference between the peak and the average is above a predetermined level.

This conventional method of misfire detection, however, has the following disadvantage. Namely, the average of the lengths of rotation periods of the engine is first determined and this average is used as the reference value. A substantial time is needed for determining this average. Thus, it is difficult to detect misfires instantaneously. Further, since the misfire detection is based on the average of rotational speed, it is difficult to attain a high reliability of detection.

SUMMARY OF THE INVENTION

It is therefore an object of this invention to provide misfire detection device for an internal combustion engine which is enhanced in the sensitivity and reliability of misfire detection while simple in structure.

The above object is accomplished in accordance with the principle of this invention by misfire detection device for an internal combustion engine comprising; a rotation speed sensor generating pulses corresponding to predetermined angular positions of respective cylinders of an internal combustion engine, wherein each pair of a high and a low level interval corresponds to a time interval within a cycle of said internal combustion engine including a combustion stroke of a cylinder of said internal combustion engine; means for determining lengths of the high and low level intervals of said pulses generated by said rotation speed sensor; and means for determining a ratio of the low and the high level intervals; and means for comparing said ratio with a predetermined reference level, wherein an occurrence of misfire is detected when said ratio exceeds the predetermined level.

Preferably, the misfire detection device for an internal combustion engine further comprises; a cylinder distinguishing sensor generating a cylinder distinguishing signal pulse per each rotation of a crank shaft of said internal combustion engine, wherein the misfiring cylinder is distinguished on the basis of said cylinder distinguishing signal pulses.

BRIEF DESCRIPTION OF THE DRAWINGS

The features which are believed to be characteristic of this invention are set forth with particularity in the appended claims. The structure and method of operation of this invention itself, however, will be best understood from the following detailed description, taken in conjunction with the accompanying drawings, in which:

In the drawings, like reference numerals represent like or corresponding parts or portions.

DETAILED DESCRIPTION OF THE PREFERRED EMBODIMENT

Referring now to the accompanying drawings, the preferred embodiment of this invention is described.

Figure 1:
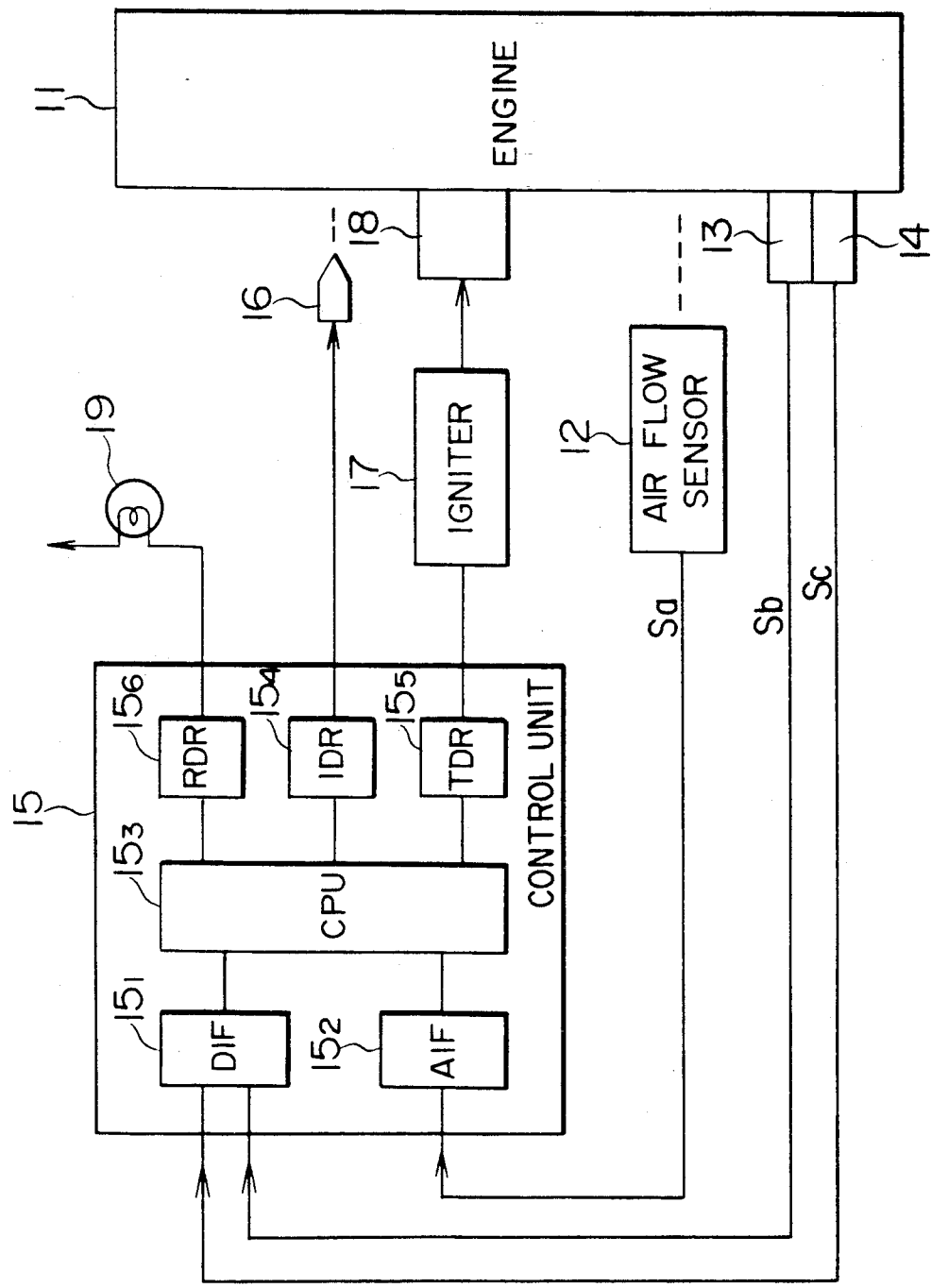
FIG. 1 is a block diagram showing a misfire detection device according to this invention as applied to an electronic control system of an automotive engine.

FIG. 1 is a block diagram showing a misfire detection device according to this invention as applied to an electronic control system of an automotive engine. In FIG. 1, on the air intake path of an automotive four-cylinder gasoline engine 11 is disposed a thermal-type air flow sensor 12. The air flow signal Sa outputted from the thermal-type air flow sensor 12 is supplied to a control unit 15 described below. A cylinder distinguishing sensor 13 and a rotation signal sensor 14 are mounted to the cam shaft of the engine 11 for the purpose of distinguishing the cylinders and obtaining the rotation information. The cylinder distinguishing signal Sb of the cylinder distinguishing sensor 13 consists of pulses, one pulse being generated per rotation of the cam shaft. The rotation signal Sc (see FIG. 2) of the rotation signal sensor 14 consists of cycles of four pulses corresponding to respective four cylinders, wherein the rising and falling edges of the pulses correspond to predetermined angular positions of respective cylinders. The cylinder distinguishing signal Sb and the rotation signal Sc are supplied to the control unit 15.

The control unit 15 includes; a digital interface 151 to which the cylinder distinguishing signal Sb and the rotation signal Sc are inputted; an analog interface 152 to which the air flow signal Sa, etc., are inputted; a CPU or microcomputer 153; an injector driver(IDR) 154 for driving an injector 16; an ignition driver (TDR) 155 for driving the ignition devices such as an igniter 17 and a distributor with a built-in coil 18; and an alarm lamp driver (RDR) 156 for driving a misfire detection alarm lamp 19.

The control unit 15 controls optimally the ignition timing and the fuel injection in accordance with the operational state of the engine 11. Further, during the combustion (expansion) stroke of respective cylinders of the engine 11 as determined from the cylinder distinguishinh signal Sb, the control unit 15 determines the time ratios of the high and the low intervals of the rotation signal Sc during each cycle of the rotation signal Sc, and on the basis of the ratios thus determined, detects occurrences of misfires and distinguishes the abnormally burning cylinder. When a misfire is thus detected, the control unit 15 drives the misfire detection alarm lamp 19 via the alarm lamp driver (RDR) 156.

Figure 2:
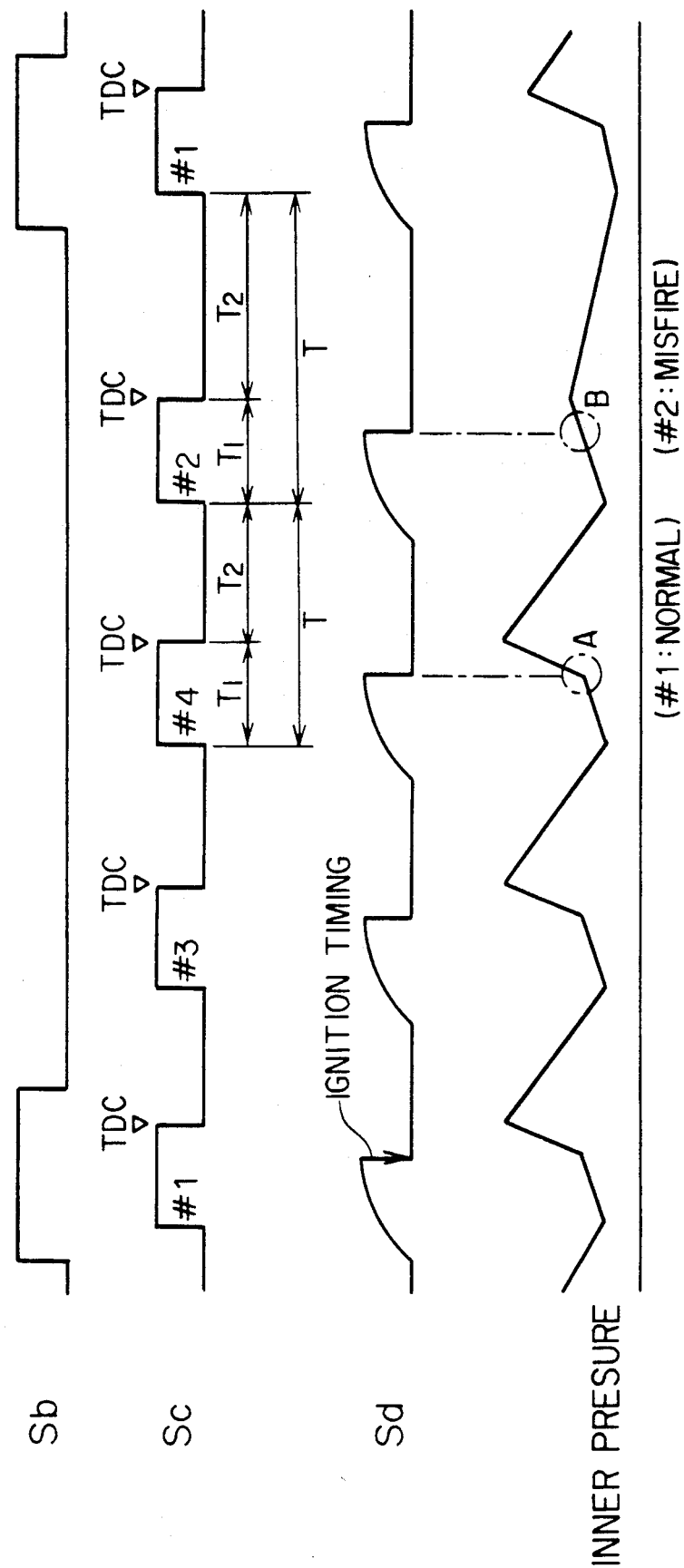
FIG. 2 shows waveforms of the cylinder distinguishing signal Sb, the rotation signal Sc, and the ignition signal Sd, and the variation of the inner pressure of the cylinders of the engine.

The control unit 15, or more specifically, the microcomputer 153 determines the top dead center (TDC) of respective cylinders at the trailing edges of the rotation signal Sc as shown in FIG. 2. Further a particular cylinder (cylinder #1) is distinguished at the rising edge of rotation signal Sc which overlaps with the high level of the cylinder distinguishing signal Sb. Other cylinders are distinguished in succession at the respective rising edges of rotation signal Sc. As represented by the waveform at the bottom of FIG. 2, the inner pressure within respective cylinders rises rapidly, as shown at A for the cylinder #4, after the ignition when the cylinder is normally ignited. On the other hand, when the corresponding cylinder misfires as shown at B for the cylinder #2, the rise of the inner pressure within the cylinder is slow (and hence the increase in the rotational speed is also slow) since the cylinder is ignited at a wrong timing.

Thus, according to this invention, for each cycle, the pulse widths (the high level interval) $T_1$ and the time lengths between successive pulses (the low level interval) $T_2$ of rotation signal Sc (each pair of the pulse width $T_1$ and the low level interval $T_2$ of rotation signal Sc corresponds to a time interval including the combustion stroke of the corresponding cylinder of the engine) are measured to determine the ratio $T_2/T_1$ or $T_2/T$. When this ratio exceeds above a predetermined level, an occurrence of a misfire is detected.

Figure 3:
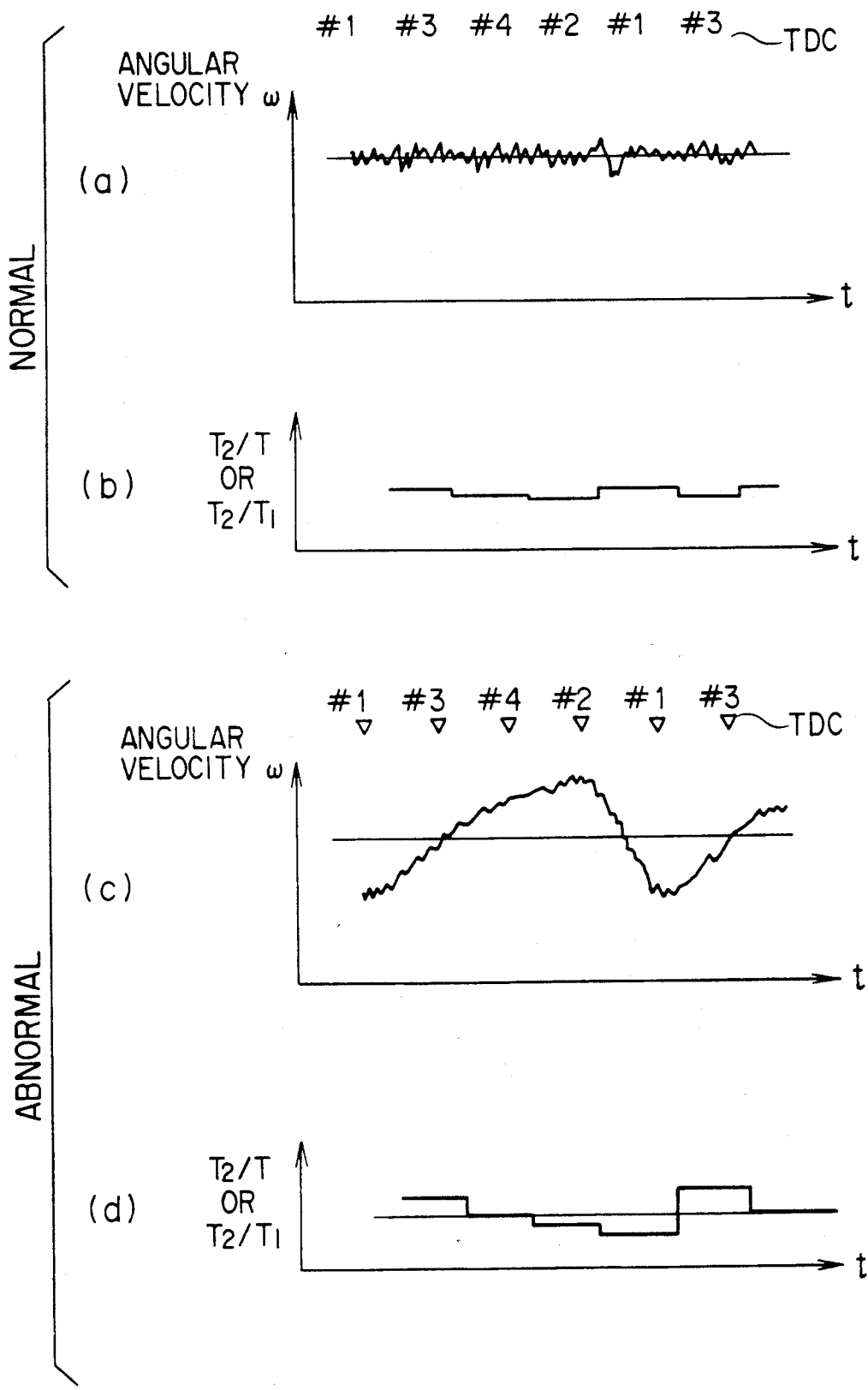
FIG. 3 shows the variations of the rotational speed (angular velocity) of the engine and the low level interval ratio $T_2/T_1$ or $T_2/T$ of rotation signal Sc when the engine is normal ((a) and (b)) and misfiring ((c) and (d))

FIG. 3 shows the variations of the rotational speed (angular velocity) of the engine and the low level interval ratio $T_2/T_1$ or $T_2/T$ of rotation signal Sc when the engine is normal ((a) and (b)) and misfiring ((c) and (d)). The curves (c) and (d) represent the case where the cylinder #2 is misfiring. The ratio of the low level interval $T_2$ to the pulse width $T_1$ or pulse period $T$ of rotation signal Sc increases after an occurrence of misfire. Thus, an occurrence of misfire can be detected on the basis of the variation of the ratio $T_2/T_1$ or $T_2/T$.

Figure 4:
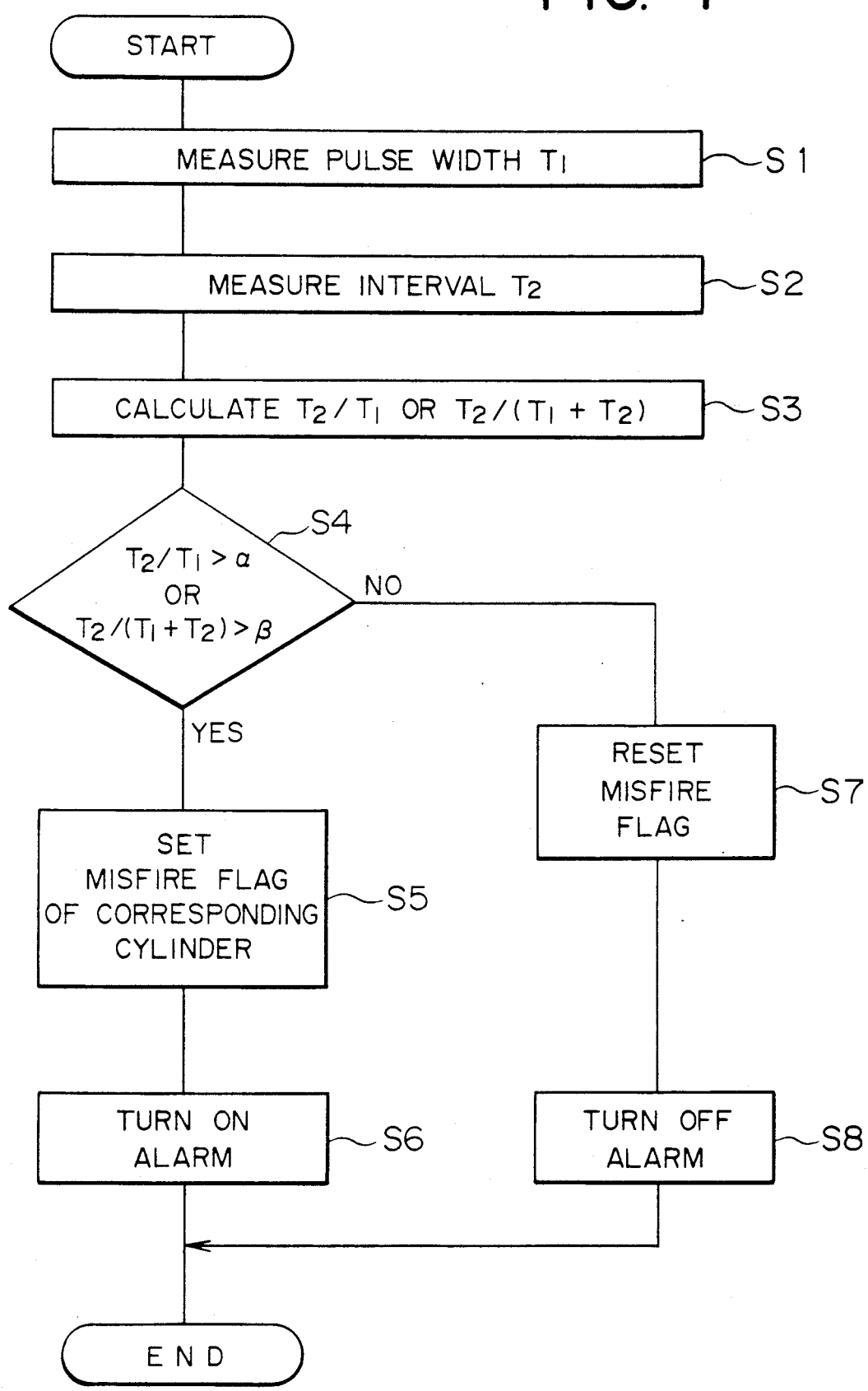
FIG. 4 is a flow chart showing the steps by which occurrences of misfire are determined according to this invention.

FIG. 4 is a flow chart showing the steps by which occurrences of misfire are determined according to this invention, by determining whether or not the ratio $T_2/T_1$ or $T_2/T = T_2(T_1+T_2)$ exceeds a predetermined level.

At step S1, the control unit 15 measures the pulse width (the high level time length) $T_1$ of rotation signal Sc. Next at step S2, the control unit 15 measures the low level time length $T_2$ of rotation signal Sc. Further, at step S3, the control unit 15 calculates and determines the ratio $T_2/T_1$ or $T_2/T = T_2/(T_1+T_2)$ on the basis of the measurements of $T_1$ and $T_2$.

At step S4, the ratio $T_2/T_1$ or $T_2/T$ is compared with respective predetermined reference level $\alpha$ or $\beta$ to determine whether or not the ratio exceeds it. If the judgment at step S4 is affirmative, the execution proceeds to step S5, where the misfire flag for the corresponding cylinder is set, and at the next step S6, the misfire detection alarm lamp is turned on. On the other hand, when the judgment at step S4 is negative, the execution proceeds to step S7, where the misfire flag is reset. Further, at step S8 the alarm lamp 19 is turned off. An occurrence of misfire can thus be notified by the misfire detection alarm lamp 19.

What is claimed is:

1. A misfire detection device for an internal combustion engine, comprising:

a rotation speed sensor generating pulses corresponding to predetermined angular positions of respective cylinders of an internal combustion engine, wherein each pair of a high and a low level interval corresponds to a time interval within a cycle of said internal combustion engine including a combustion stroke of a cylinder of said internal combustion engine;

means for determining lengths of the high and low level intervals of said pulses generated by said rotation speed sensor;

means for determining a ratio of the low and the high level intervals; and means for comparing said ratio with a predetermined reference level, wherein an occurrence of misfire is detected when said ratio exceeds the predetermined level.

2. A misfire detection device for an internal combustion engine as claimed in claim 1, further comprising: a cylinder distinguishing sensor generating a cylinder distinguishing signal pulse per each rotation of a crank shaft of said internal combustion engine, wherein the misfiring cylinder is distinguished on the basis of said cylinder distinguishing signal pulses.

* * * * *